March 18, 1924.

G. T. VON GERMETEN ET AL

DISAPPEARING FOOT REST

Filed Feb. 16, 1923

Witnesses

Inventors

Patented Mar. 18, 1924.

1,487,495

UNITED STATES PATENT OFFICE.

GEORGE THEO. VON GERMETEN AND CARL F. HANSEN, OF RACINE, WISCONSIN.

DISAPPEARING FOOT REST.

Application filed February 16, 1923. Serial No. 619,399.

*To all whom it may concern:*

Be it known that we, GEORGE T. VON GERMETEN and CARL F. HANSEN, both citizens of the United States, and residents of Racine, in the county of Racine and State of Wisconsin, have invented certain new and useful Improvements in Disappearing Foot Rests; and we do hereby declare that the following is a full, clear, and exact description thereof.

This invention relates to disappearing foot rests and is particularly directed to a disappearing foot rest design for automobiles.

In automobile practice it has been customary to provide a foot rest in the tonneau adjacent the rear seat, so arranged that it is permanently exposed and above the floor. It frequently happens that it is desirable to store suitcases, packages and other articles in the rear portion of the automobile and such projecting foot rest is an unhandy and unavoidable obstacle as at present constructed. In addition to this, a projecting foot rest is frequently in the way of entering or leaving passengers and occasions numerous mishaps.

It is to overcome the above noted defects that the present invention is designed and objects of such invention are, therefore, to provide a disappearing foot rest for automobiles, which is so constructed that it may be instantly moved from its exposed or operative position to a position flush with the floor of the automobile.

Further objects are to provide a disappearing foot rest, which will be comfortable for occupants of the rear seat, which may be easily manipulated and which, when in its flush position, does not have any portion projecting above the plane of the floor.

Embodiments of the invention are shown in the accompanying drawing, in which.

Figure 1:
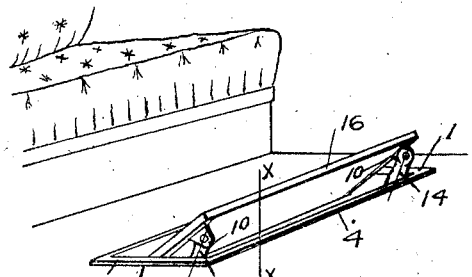
Figure 1 is a fragmentary prospective view of the rear portion of an automobile, showing the foot rest in elevated position.
Figure 2:
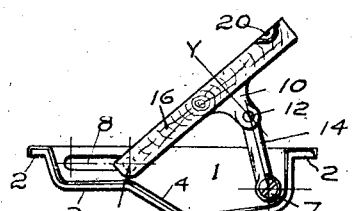
Figure 2 is a sectional view on the line X—X of Figure 1.
Figure 6:
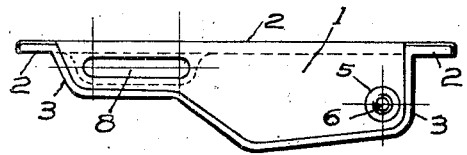
Figure 6 is an enlarged view of one of the end members of the casing.

Referring to the drawings, it will be seen that the foot rest comprises a casing provided with end members 1 which have outwardly projecting flanges 2 and inwardly directed flanges 3. The intermediate portion of the casing is composed of a sheet metal stamping 4 provided with a depressed forward portion and a shallower rear portion, which conforms to the outline of the flanges 3. This stamping is positioned within the flanges 3 of the end members and is supported thereby, as may be clearly seen from Figures 2—3 and 4. If desired, this stamping may be equipped with channel flanges 19, provided with screw receiving apertures 18. The end members and stamping, which together constitute the casing, are inset in the floor of the automobile in front of the rear seat, as indicated in Figure 1, the entire device being supported by the marginal flanges.

Figure 4:
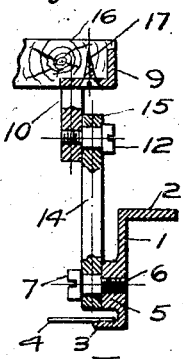
Figure 4 is an enlarged fragmentary, sectional view on the line Y—Y of Figure 2.
Figure 8:
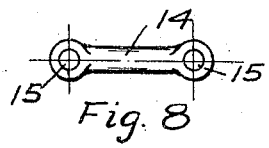
Figure 8 is a view of one of the connecting links.
Figure 9:
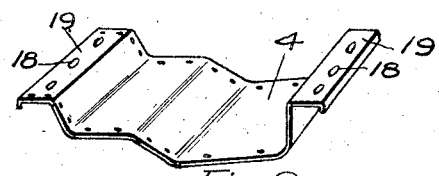
Figure 9 is a view of the main body of the casing.

The end members 1 are provided with forward bosses 5, adapted to receive screws 6, provided with enlarged heads 7, as illustrated in Figure 4. The rear portion of the end members 1 are provided with slots 8 for a purpose hereinafter to be described.

Figure 7:
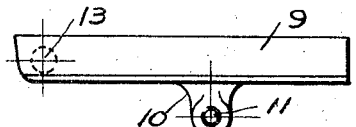
Figure 7 is a view of the end members of the toe board or foot rest.
Figure 5:
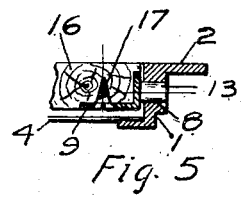
Figure 5 is a detail of the trunnion bearings and associated parts.

A rectangular toe board, or foot rest board 16, is provided with end members 9, inset along the lower side edges of the foot board and secured in position by screws 17. These members 9 are provided with downwardly extending lugs 10, having tapped holes 11 (see Figure 7) and at their rear ends are provided with outwardly projecting trunnions 13, adapted to slidably fit within the slots 8, as may be seen from Figure 5. Connecting links 14 are pivotally mounted upon the screws 6 and, by means of screws 12, are joined to the lugs 10—such connecting links being preferably provided with relatively large apertures 15, adapted to engage the enlarged portion of the screws 6 and 12, as illustrated in Figure 4, so as to prevent binding of the links between the heads of the screws and the adjacent portions of the apparatus.

Figure 3:
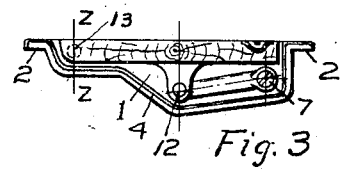
Figure 3 is a view corresponding to Figure 2, showing foot rest in its flush or retracted position.

The operation of the apparatus is as follows:

When it is desired to elevate the foot rest, the operator's fingers are slipped into the finger grips 20 (see Figure 2) adjacent to forward portion of the foot board and such forward portion is pulled upwardly and forwardly, the links 14 permitting a free pivotal action and the trunnions 13 sliding in guiding slots 8. In this manner the foot rest assumes the position illustrated in Figure 2, and provides a convenient rest at a substantially correct angle for the comfort of the occupants of the rear seat. When the foot rest is not in use, it may be readily pushed back into its retracted position as illustrated in Figure 3, to thereby provide an unobstructed floor throughout the rear portion of the automobile.

It is to be noted that the ends of the slots 8 contact with the trunnions 13 when the foot rest is in its elevated position and cooperate with the link mechanism to prevent further motion of the foot rest and thereby constitute a stop.

Obviously, the casing may be provided with a flat bottom and may be relatively shallow, suitable depressions being provided for each of the links 14.

In the modified form of the invention, which may be used to furnish a cheaper construction, a rectangular, substantially U-shaped foot rest is provided, which consists of side links, or arms, 21, integrally joined by means of the transverse member 22. The free ends of the arms 21 are pivoted within a trough-like casing 23, which is inset in the floor of the automobile and may conveniently be provided with apertured flanges 24, by means of which it is secured to the floor.

Figure 10:
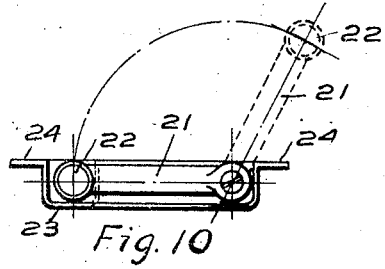
Figure 10 is a sectional view, showing a modified form of foot rest.
Figure 11:
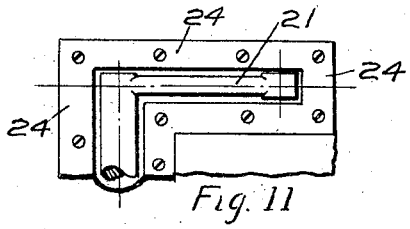
Figure 11 is a fragmental plan view of the structure, shown in Figure 10.

In this form of the invention the foot rest is readily elevated, as indicated in dotted lines in Figure 10 and the arms 21 will contact with the forward vertical portions of the trough-like casing and prevent further motion of the arms, thereby providing a secured positioning of the foot rest.

It will be seen, therefore, that a foot rest has been provided which may be quickly elevated to the desired position to accommodate occupants of the automobile and which may be quickly depressed to a position flush with the floor of the automobile, and, consequently, out of the way.

It will further be seen that an attractive form of foot rest has been provided, which is of sturdy and substantial construction and which may be cheaply and readily produced.

Although two specific forms of the invention have been described in considerable detail, it is to be understood that the invention may take various forms and is to be limited only as set forth in the appended claim.

We claim:

A disappearing foot rest for a vehicle comprising a casing adapted to be inset within the floor of the vehicle and having outwardly extending supporting flanges, a foot rest plate provided with trunnions projecting laterally therefrom adjacent its rear edge, said casing having slots therein for the sliding reception of said trunnion, and a link pivotally joined to said foot rest plate at a point intermediate the ends of said plate and pivotally joined to the inner side of said casing whereby said foot rest may be slid with its inner end continuously positioned within said casing and with its forward end elevated and retained in such position.

In testimony that we claim the foregoing we have hereunto set our hands at Racine, in the county of Racine and State of Wisconsin.

GEO. THEO. von GERMETEN.
CARL F. HANSEN.